US011608776B2

(12) United States Patent
Nagai et al.

(10) Patent No.: US 11,608,776 B2
(45) Date of Patent: Mar. 21, 2023

(54) TRACTOR

(71) Applicant: Kubota Corporation, Osaka (JP)

(72) Inventors: Hiroki Nagai, Sakai (JP); Sachiko Tsujimori, Sakai (JP); Tomohisa Yamamoto, Sakai (JP); Taisuke Hashimoto, Sakai (JP); Kunihiro Yoneguchi, Sakai (JP)

(73) Assignee: Kubota Corporation, Osaka (JP)

( * ) Notice: Subject to any disclaimer, the term of this patent is extended or adjusted under 35 U.S.C. 154(b) by 195 days.

(21) Appl. No.: 17/069,922

(22) Filed: Oct. 14, 2020

(65) Prior Publication Data

US 2021/0180513 A1 Jun. 17, 2021

(30) Foreign Application Priority Data

Dec. 17, 2019 (JP) ............................. JP2019-227655

(51) Int. Cl.
*F02B 67/06* (2006.01)
*F02B 63/04* (2006.01)
*F01P 3/18* (2006.01)
*F01P 5/04* (2006.01)
*F16H 7/02* (2006.01)
*B60K 11/02* (2006.01)
*B60H 1/00* (2006.01)
*B60H 1/32* (2006.01)
(Continued)

(52) U.S. Cl.
CPC ......... *F02B 67/06* (2013.01); *B60H 1/00378* (2013.01); *B60H 1/3222* (2013.01); *B60K 11/02* (2013.01); *B62D 49/06* (2013.01); *F01P 3/18* (2013.01); *F01P 5/04* (2013.01); *F02B 63/042* (2013.01); *F16H 7/02* (2013.01); *A01D 2101/00* (2013.01)

(58) Field of Classification Search
CPC ... F02B 67/06; B60H 1/00378; B60H 1/3222; F16H 7/02
See application file for complete search history.

(56) References Cited

U.S. PATENT DOCUMENTS 3,983,715 A * 10/1976 Hair, Jr. ................. B60K 25/00
62/243
4,081,050 A * 3/1978 Hennessey ......... B62D 49/0621
180/68.1
9,102,221 B1 * 8/2015 Monfort .................... B60K 1/00
(Continued)

FOREIGN PATENT DOCUMENTS

JP 5659923 U 5/1981
JP 1162581 A 3/1999
(Continued)

*Primary Examiner* — Long T Tran
(74) *Attorney, Agent, or Firm* — The Webb Law Firm

(57) ABSTRACT

In a tractor, a radiator is arranged on one front-rear side relative to an engine. A cooling fan is provided between the radiator and an engine. A fan drive belt is wound around a fan support shaft and around an output shaft of the engine extending below the fan support shaft. A compressor is located above the output shaft and is supported to the engine at a position offset to one lateral side of the engine relative to the fan support shaft. A compressor drive belt is wound around the output shaft and a compressor drive shaft. The compressor drive belt is located on a side where the compressor is located relative to the fan support shaft, when viewed in a front-rear direction.

4 Claims, 5 Drawing Sheets

(51) Int. Cl.
  *B62D 49/06* (2006.01)
  *A01D 101/00* (2006.01)

(56) References Cited

U.S. PATENT DOCUMENTS

| | | | | |
|---|---|---|---|---|
| 2010/0313829 A1* | 12/2010 | Ayukawa | ............... | F02F 7/0073 |
| | | | | 123/41.44 |
| 2014/0034408 A1* | 2/2014 | Fujita | ................. | E02F 9/20 |
| | | | | 180/291 |
| 2017/0218808 A1* | 8/2017 | Kurokawa | ............. | F02M 26/22 |
| 2017/0218822 A1* | 8/2017 | Yamashita | .............. | F01N 13/18 |

FOREIGN PATENT DOCUMENTS

| | | | |
|---|---|---|---|
| JP | 200857329 | A | 3/2008 |
| JP | 201077876 | A | 4/2010 |
| JP | 201470615 | A | 4/2014 |
| JP | 2015190317 | A | 11/2015 |
| JP | 2016145038 | A | 8/2016 |
| JP | 2016196760 | A | 11/2016 |

\* cited by examiner

TRACTOR

CROSS-REFERENCE TO RELATED APPLICATION

This application claims priority to Japanese Patent Application No. 2019-227655 filed Dec. 17, 2019, the disclosure of which is hereby incorporated by reference in its entirety.

BACKGROUND OF THE INVENTION

1. Field of the Invention

The present invention is directed to a tractor.

2. Description of the Related Art

A certain type of conventional tractor includes an engine section, a riding-type driving section, and an air-conditioning apparatus for the driving section. One of such a tractor is disclosed in JP2016-145038A.

The tractor includes an engine mounted on a front frame, and a riding-type driving section. The tractor further includes a cabin which covers the riding-type driving section, and an air-conditioning unit for cabin interior air.

The tractor as described above generally arranges a compressor of the air-conditioning unit in the engine section, whereby the compressor may be driven by the engine in an engine section. However, the engine section tends to be enlarged, if a structure to transmit the engine power to the compressor becomes complicated or large in scale.

Therefore, there is need for a tractor that the engine power can be transmitted to the compressor with a simple and compact power transmission structure.

SUMMARY OF THE INVENTION

In view of the above, the tractor as below is proposed.
A tractor comprising:
an engine section including:
  an engine,
  a radiator arranged on one front-rear side of the engine for cooling the engine,
  a cooling fan rotatably provided between the radiator and the engine for supplying cooling air to the radiator,
  a fan support shaft extending from the engine to the cooling fan for rotatably supporting the cooling fan,
  an output shaft protruding from the engine toward a side where the cooling fan is located, the output shaft extending below the fan support shaft and
  a fan drive belt wound around the output shaft and a fan drive part of the cooling fan, for transmitting power from the output shaft to the fan drive part;
a riding-type driving section; and
an air-conditioning apparatus having a compressor, and performs air conditioning for the driving section;
wherein the compressor is located above the output shaft and is supported to the engine at a position offset to one lateral side of the engine relative to the fan support shaft,
the compressor has a compressor drive shaft protruding toward a side where the output shaft is located,
a compressor drive belt is wound around the output shaft and the compressor drive shaft to transmit power from the output shaft to the compressor drive shaft, and
the compressor drive belt is located on a side where the compressor is located relative to the fan support shaft, when viewed in a front-rear direction.

With this configuration, when viewed in the front-rear direction, only by extending the compressor drive belt along a straight line between an axis of the engine output shaft and an axis of the compressor drive shaft, the output shaft may be operably connected to the compressor drive shaft. Whereby, the engine power can be transmitted from the engine to the compressor with a simple and compact power transmission structure.

In one preferred embodiment, the tractor further comprises an alternator located below the compressor to be supported to the engine at a position offset to the one lateral side relative to the fan support shaft;
wherein the fan drive belt is wound around an alternator drive shaft of the alternator to transmit power from the output shaft to the alternator drive shaft.

With this configuration, the compressor does not become an obstacle to arrangement of the fan drive belt, and the alternator does not become an obstacle to arrangement of the compressor drive belt. Therefore, not only can power transmission from the engine to the compressor be performed with the simple and compact power transmission structure, but also power transmission from the engine to the alternator can be performed with the simple and compact power transmission structure.

In one preferred embodiment, the compressor drive belt is arranged on a side where the cooling fan is located relative to the fan drive belt.

With this configuration, when the compressor drive belt is to be removed from the output shaft and the compressor drive shaft, the removal can be performed on the side where the cooling fan is located relative to the fan drive belt, and thus the fan drive belt does not become an obstacle. Therefore, attachment/detachment and replacement of the compressor drive shaft can be easily performed.

In one preferred embodiment, the fan support shaft includes a base support shaft supported to the engine, and an extension support shaft which is extended from the base support shaft toward the cooling fan.

With this configuration, for increasing a distance between the engine and the cooling fan so as to allow arrangement of the compressor drive belt, compared with changing the entire output shaft to a long output shaft, only a simple measure of providing the extension shaft is needed, which results in low cost.

Further aspects and advantages thereof will be apparent upon reading the detailed description as below.

DETAILED DESCRIPTION OF PREFERRED EMBODIMENTS

Figure 1:
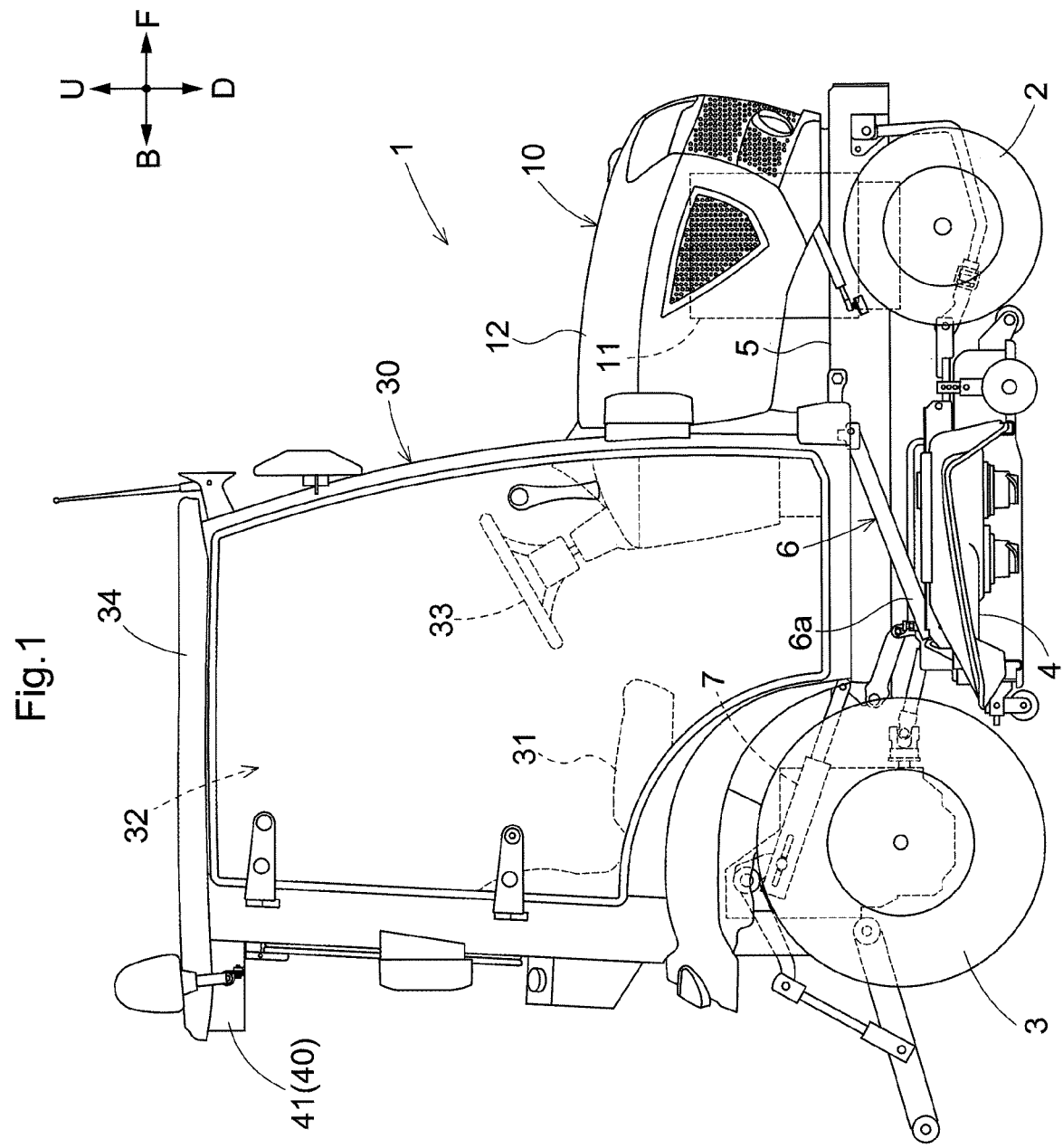
FIG. 1 is a right side view showing an overall mower vehicle with a tractor (lawn tractor) according to one embodiment.

As shown in FIG. 1, a mower vehicle includes a tractor 1, thus configuring a lawn tractor. Between a pair of right and left front wheels 2 and a pair of right and left rear wheels 3 provided in a traveling vehicle body of the tractor 1, there is a provided a mowing device 4. The mowing device 4 is supported to a vehicle body frame 5 of the traveling vehicle body via a link mechanism 6. A hydraulic cylinder (not shown) is connected to a rear link 6a of the link mechanism 6 via an interlocking rod 7, etc. By pivotally operating the link mechanism 6 up and down relative to the vehicle body frame 5 with expansion and contraction of the hydraulic cylinder, the mowing device 4 is raised and lowered relative to the traveling vehicle body.

In following description, with respect to the traveling vehicle body of the tractor 1, the direction of arrow F shown in FIG. 1 is defined as "front side of the vehicle body", the direction of arrow B is defined as "rear side of the vehicle body", the direction of arrow U shown in FIG. 1 is defined as "upper side of the vehicle body", the direction of arrow D is defined as "lower side of the vehicle body", the direction of a front side of the figure is defined as "right side of the vehicle body", and the direction of a back side of the figure is defined as "left side of the vehicle body".

[Configuration of Tractor]

As shown in FIG. 1, the traveling vehicle body of the tractor 1 includes a vehicle body frame 5 which extends in a front-rear direction of the vehicle body. At a front part of the vehicle body frame 5, there are provided the pair of drivable and steerable right and left front wheels 2. At a rear part of the vehicle body frame 5, there are provided the pair of drivable right and left rear wheels 3. At a front part of the vehicle body, an engine section 10 having an engine 11 is formed. At a rear part of the vehicle body, a riding-type driving section 30 is formed. The driving section 30 includes: a riding space 32 having a driver's seat 31, a steering wheel 33 disposed on the front side of the driver's seat 31 for steering the front wheels 2, and a cabin 34 which covers the riding space 32. At a rear upper part of the cabin 34, there is provided an air-conditioning unit 41 which forms an air-conditioning apparatus 40 for the driving section 30.

[Configuration of Air-Conditioning Apparatus]

Figure 2:
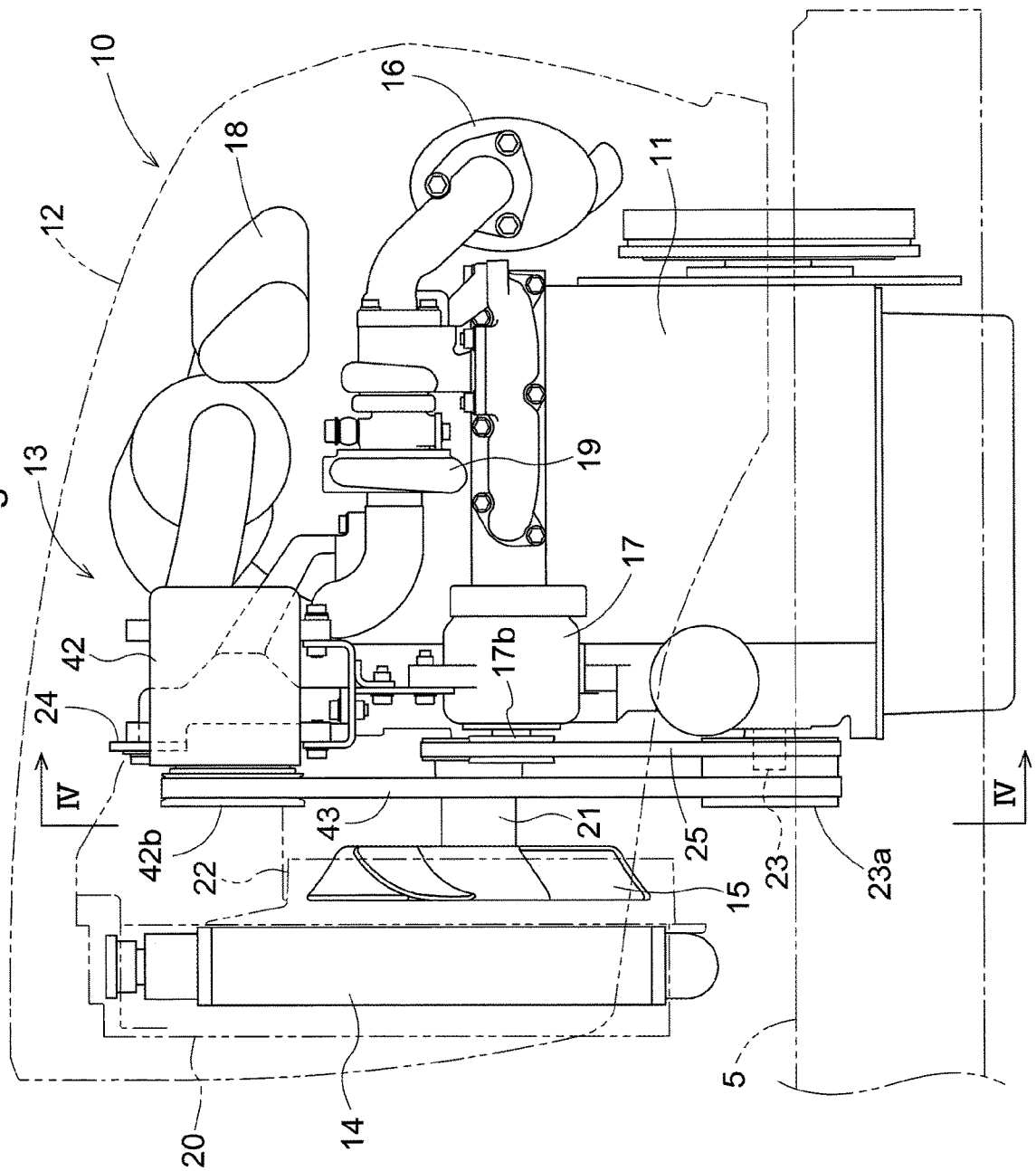
FIG. 2 is a right side view showing an engine section thereof.

The air-conditioning apparatus 40 for the driving section 30 includes the air-conditioning unit 41 provided in the cabin 34 as shown in FIG. 1, and a compressor 42 provided in the engine section 10 as shown in FIG. 2 for compressing a refrigerant. In the air-conditioning unit 41 includes an evaporator (not shown), and a fan (not shown) which supplies, into the cabin, air-conditioning air after heat-exchange by the evaporator.

[Configuration of Engine Section]

Figure 3:
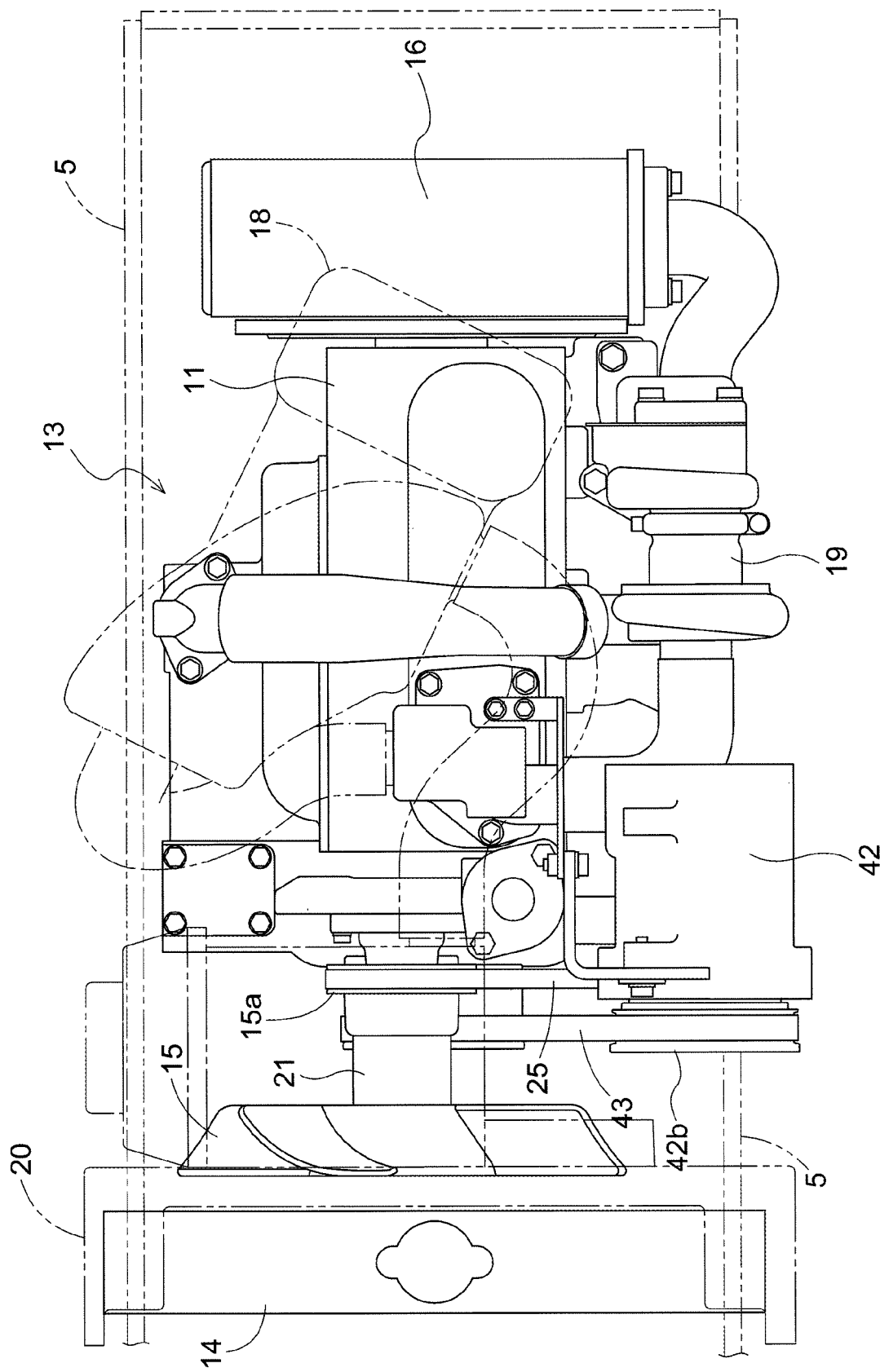
FIG. 3 is a plan view showing the engine section.

As shown in FIGS. 2 and 3, the engine section 10 includes an engine room 13 formed by an engine hood 12. The engine room 13 houses the engine 11, a radiator 14 which cools the engine 11, a cooling fan 15 which supplies cooling air to the radiator 14, a muffler 16 for the engine 11, and the compressor 42 of the air-conditioning apparatus 40.

As shown in FIGS. 2 and 3, an alternator 17 is supported to a lateral side part of the engine 11. An air intake system of the engine 11 includes a resonator 18 and a turbocharger 19. The muffler 16 is provided at a position located on a front side relative to the engine 11, with an exhaust gas processing direction thereof extending along a lateral width direction of the vehicle body. The muffler 16 is formed to have an elliptical shape when viewed in a direction along the exhaust gas processing direction, with a short diameter direction of the ellipse being oriented along the front-rear direction of the vehicle body.

As shown in FIG. 2, the radiator 14 is arranged at a position located on a rear side of the vehicle body relative to the engine 11. The radiator 14 is covered with a radiator cover 20 on both lateral sides and an upper side thereof. The cooling fan 15 is provided between the engine 11 and the radiator 14. The cooling fan 15 is supported to a fun support shaft 21 which is rotatably extended from the engine 11 toward the cooling fan 15. The cooling fan 15 and the fan support shaft 21 are relatively unrotatably connected. A fan shroud section 22 is formed in the radiator cover 20.

Figure 4:
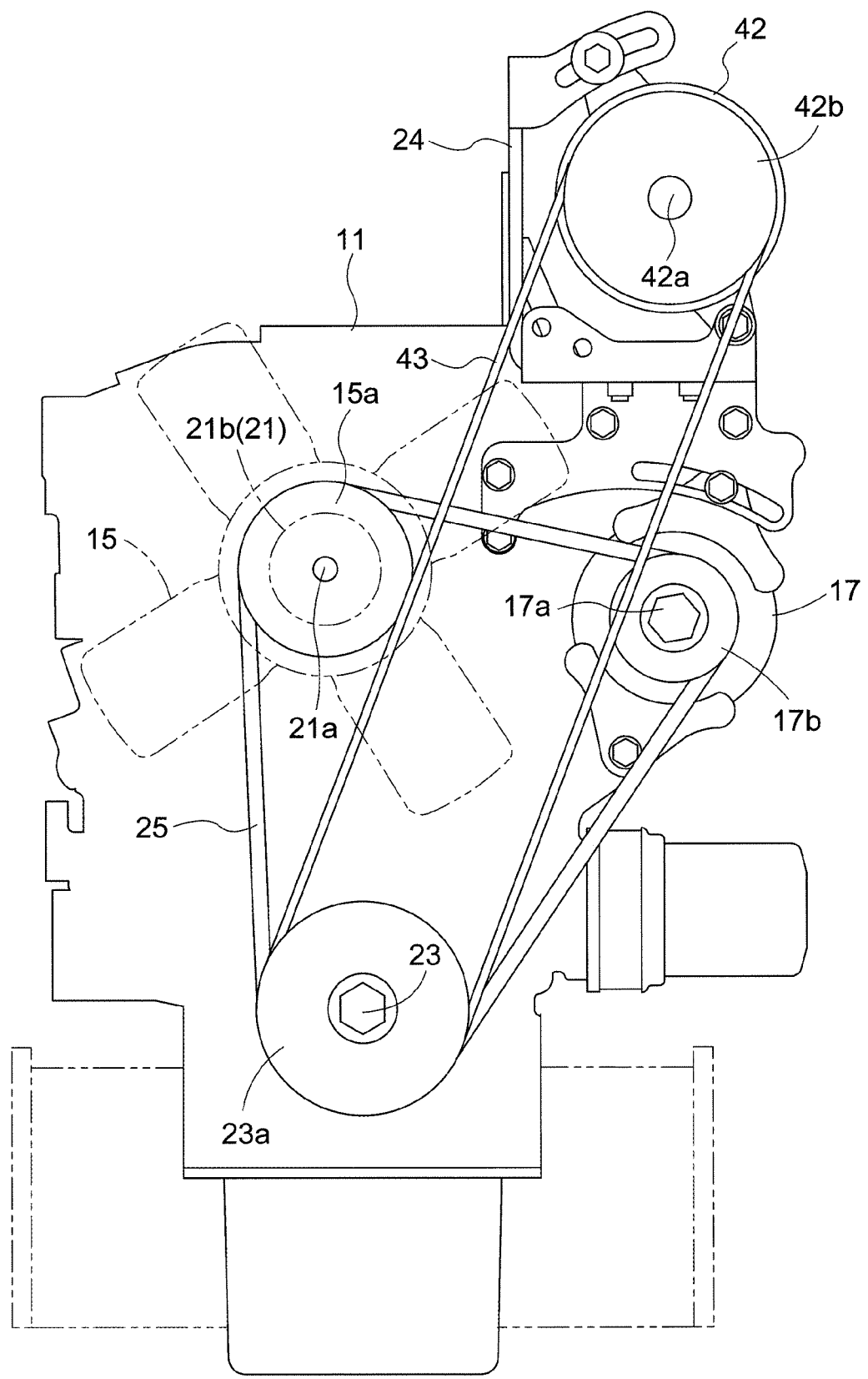
FIG. 4 is a view in section as seen in a direction "IV-IV" in FIG. 2.

As shown in FIGS. 2 and 4, the engine 11 is provided with an output shaft 23 which protrudes, below the fan support shaft 21, from the engine 11 toward a side where the cooling fan 15 is located. The compressor 42 is located above the output shaft 23, and is supported to the engine 11 at a position offset to a right lateral side of the engine 11 relative to the fan support shaft 21. More specifically, a support member 24 protrudes upward from the engine 11, and the compressor 42 is supported to the support member 24. The alternator 17 is located below the compressor 42, and supported to the engine 11 at the position offset to the right lateral side of the engine 11 relative to the fan support shaft 21.

Figure 5:
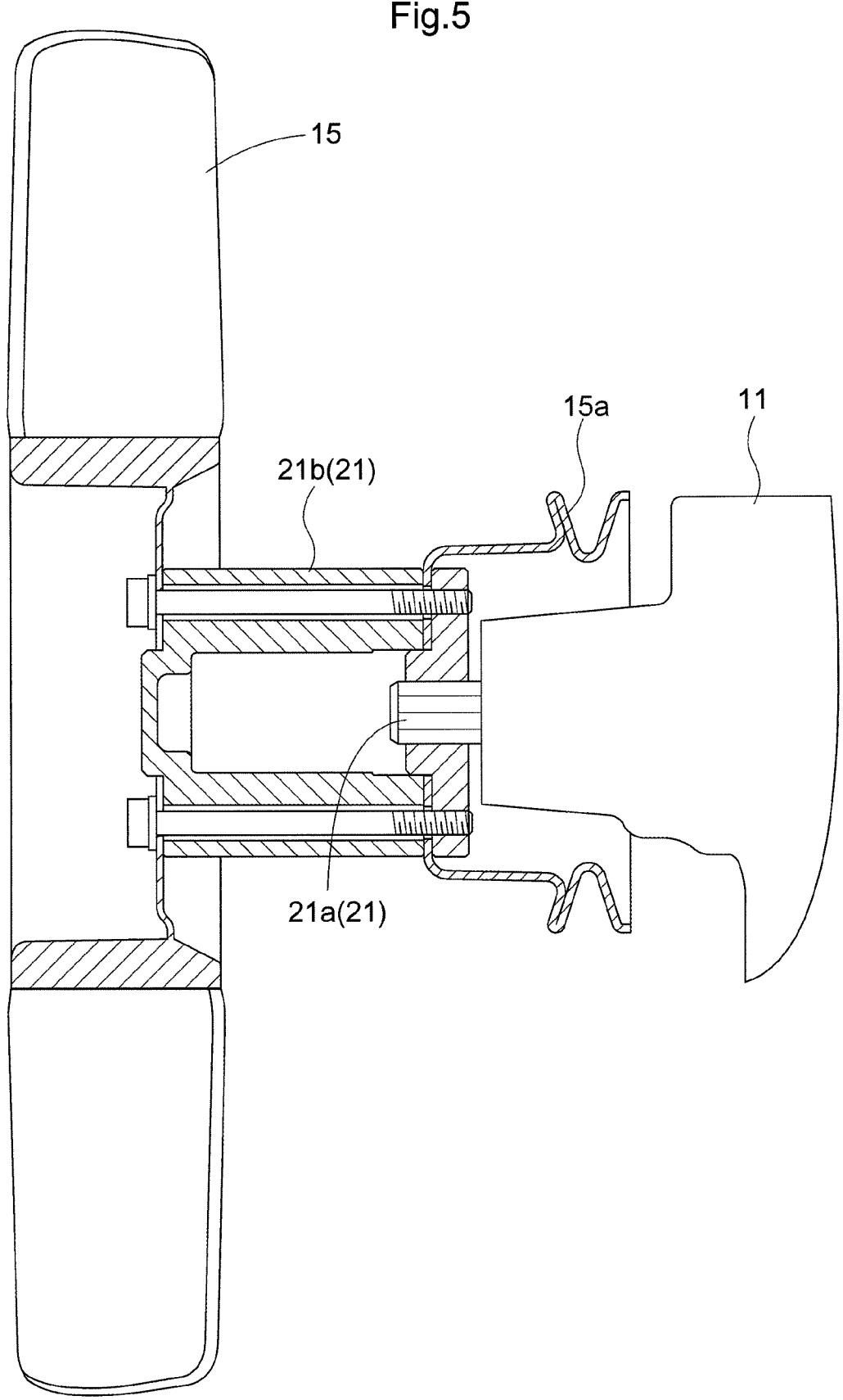
FIG. 5 is a view in section of a fan support shaft.

As shown in FIGS. 2 and 4, a fan drive belt 25 is wound around an output pulley part 23a on the output shaft 23 and a fan drive part 15a on the cooling fan 15. As shown in FIGS. 4 and 5, the fan drive part 15a is formed in the fan support shaft 21, and disposed in the cooling fan 15 via the fan support shaft 21. As shown in FIG. 5, the fan support shaft 21 includes a base support shaft 21a supported to the engine 11, and an extension support shaft 21b which is extended from the base support shaft 21a toward the cooling fan 15 and is connected to the cooling fan 15. Power of the output shaft 23 is transmitted to the fan drive part 15a by the fan drive belt 25, thereby driving the cooling fan 15. As shown in FIGS. 2 and 4, the fan drive belt 25 is wound around an input pulley part 17b which is provided in an alternator drive shaft 17a of the alternator 17. Power from the output shaft 23 is transmitted to the alternator drive part 17a by the fan drive belt 25, thereby driving the alternator 17.

As shown in FIGS. 2, 3 and 4, the compressor 42 includes a compressor drive shaft 42a which protrudes from a rear part of the compressor 42 toward a side where the output shaft 23 is located. The compressor drive shaft 42a has the input pulley part 42b mounted thereon. A compressor drive belt 43 is wound around the output pulley part 23a of the output shaft 23 and the input pulley part 42b. As shown in FIGS. 2 and 4, the compressor drive belt 43 is located on a side where the compressor 42 is located relative to the fan support shaft 21, when viewed in the front-rear direction, and is located on a side where the cooling fan 15 is located relative to the fan drive belt 25. Power from the output shaft 23 is transmitted to the compressor drive shaft 42a by the compressor drive belt 43, thereby driving the compressor 42.

Other Embodiments (1) In the foregoing embodiment, the radiator 14 is arranged on the rear side of the vehicle body relative to the engine 11. Instead thereof, the radiator 14 may be located on a front side of the vehicle body relative to the engine 11

(2) In the foregoing embodiment, the compressor 42 and the alternator 17 are located on a left lateral side of the engine 11 relative to the fan support shaft 21, but they may be located on a right lateral side of the engine 11.

(3) In the foregoing embodiment, the compressor drive belt 43 is provided on a side where the cooling fan 15 is located relative to the fan drive belt 25, but it may be provided on a side where the engine 11 is located relative to the fan drive belt 25.

(4) In the foregoing embodiment, the fan support shaft 21 has the base support shaft 21*a* and the extension support shaft 21*b*, but it may be a single shaft which is extended from the engine 11 to the cooling fan 15.

(5) In the foregoing embodiment, the tractor is included in the mower vehicle to configure the lawn tractor, but this is not limitative. The invention can be also applied to other various tractors having an engine section, a riding-type driving section, and an air-conditioning apparatus for the driving section.

What is claimed is:

1. A tractor comprising:
   an engine section including:
      an engine,
      a radiator arranged on one front-rear side of the engine for cooling the engine,
      a cooling fan rotatably provided between the radiator and the engine for supplying cooling air to the radiator,
      a fan support shaft extending from the engine to the cooling fan for rotatably supporting the cooling fan,
      an output shaft protruding from the engine toward a side where the cooling fan is located, the output shaft extending below the fan support shaft; and
      a fan drive belt wound around the output shaft and a fan drive part of the cooling fan, for transmitting power from the output shaft to the fan drive part;
   a riding-type driving section; and
   an air-conditioning apparatus having a compressor, and performing air conditioning for the driving section;
   wherein the compressor is located above the output shaft and is supported to the engine at a position offset to one lateral side of the engine relative to the fan support shaft,
   the compressor has a compressor drive shaft protruding toward a side where the output shaft is located,
   a compressor drive belt is wound around the output shaft and the compressor drive shaft to transmit power from the output shaft to the compressor drive shaft, the compressor drive belt extending along a straight line between an axis of the output shaft and an axis of the compressor drive shaft, and
   the compressor drive belt is located on a side where the compressor is located relative to the fan support shaft, when viewed in a front-rear direction.

2. The tractor according to claim 1, further comprising:
   an alternator located below the compressor to be supported to the engine at a position offset to the one lateral side relative to the fan support shaft;
   wherein the fan drive belt is wound around an alternator drive shaft of the alternator to transmit power from the output shaft to the alternator drive shaft.

3. The tractor according to claim 1, wherein the compressor drive belt is arranged on a side where the cooling fan is located relative to the fan drive belt.

4. The tractor according to claim 1, wherein the fan support shaft includes a base support shaft supported to the engine, and an extension support shaft which is extended from the base support shaft toward the cooling fan.

* * * * *